(No Model.)
W. A. GUTHRIE.
AUTOMATIC ELECTRIC FIRE ALARM.
No. 514,361. Patented Feb. 6, 1894.
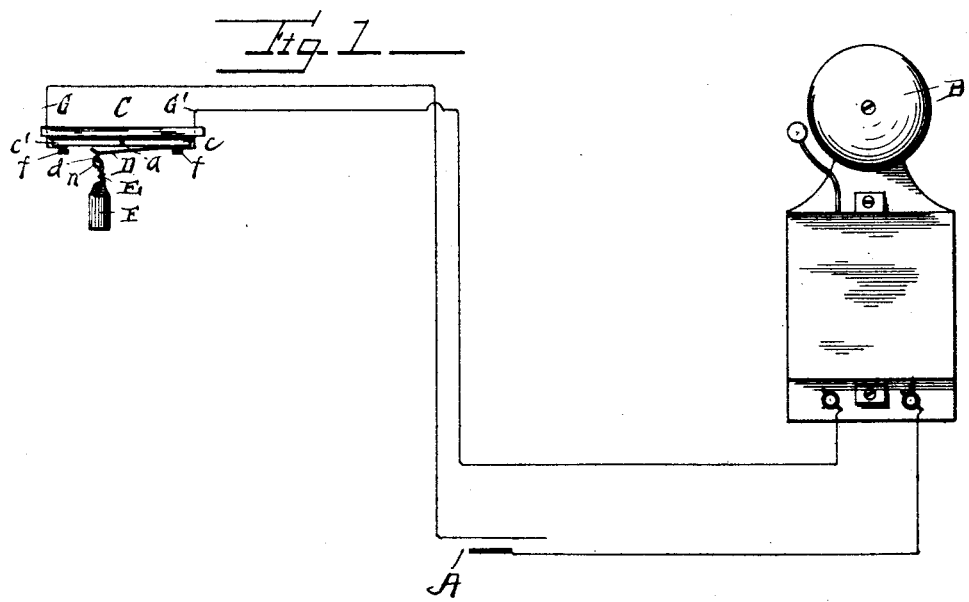
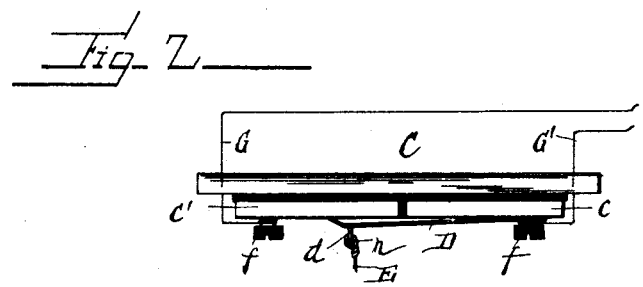
WITNESSES
Philip C. Masi.
George H. Parmelee.
INVENTOR
Wm. A. Guthrie,
by E. W. Anderson
his Attorney

UNITED STATES PATENT OFFICE.

WILLIAM ANDERSON GUTHRIE, OF DURHAM, NORTH CAROLINA.

AUTOMATIC ELECTRIC FIRE-ALARM.

SPECIFICATION forming part of Letters Patent No. 514,361, dated February 6, 1894.

Application filed August 19, 1893. Serial No. 483,500. (No model.)

*To all whom it may concern:*

Be it known that I, WILLIAM ANDERSON GUTHRIE, a citizen of the United States, and a resident of Durham, in the county of Durham and State of North Carolina, have invented certain new and useful Improvements in Automatic Electric Fire-Alarms; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a diagrammatic representation of the invention, and Fig. 2 is an enlarged elevation of the circuit-closing device.

This invention has relation to certain new and useful improvements in electrical fire alarms, the object being to provide a device of this character of simple construction, which can be put into use at a small cost and with little labor, and which can be relied upon in its action; and the invention consists in the novel construction and combination of parts, all as hereinafter described and pointed out in the appended claims.

Referring to the accompanying drawings the letter A designates a small battery, (one dry cell being sufficient) B an electric bell, of any suitable construction, and C a device in electrical circuit with said bell and battery and arranged to automatically complete the circuit upon an undue increase of temperature. Said device C comprises a pair of metallic plates $c, c'$, which are good conductors of electricity, and which have an insulated support upon a suitable block designed to be secured in the ceiling or in other suitable relation to the room or building in which the alarm is placed. The adjacent ends of said plates are separated from each other by insulating material $a$. Secured to the plate $c$ is a flat spring D whose free extremity extends across the insulated space between the plates, and is designed to contact with the plate $c'$. Near the extremity of said spring is a lug or projection $d$, having therein a small eye or aperture designed to be engaged by the hooked end of a short piece of wire E to which is attached a weight F, which normally holds said spring away from the plate $c'$. The wire E is made of any of the well known alloys which fuse at a very low temperature such as alloys of tin, lead, and bismuth, or tin, lead, bismuth, and cadmium, whose fusing point is considerably below the temperature of boiling water.

Each of the plates $c, c'$ has a binding screw $f$ to which are attached the terminals of the wires G, G' from the two poles of the battery, the wire G leading directly to one of said screws while the wire G' leads to the other screw through the bell C, the connections being clearly shown in Fig. 1.

The operation is as follows:—Whenever the temperature of the room or apartment rises to the fusing points of the alloy wire E, the said wire is immediately fused, the weight F falls, and the spring D makes contact with the plate $c'$, completing the circuit, and at once sounding the alarm.

Owing to the readiness with which the wire E fuses, contact with the flame is not necessary for its release, as this will take place upon the increase of temperature to the fusing point though the fire may be at some other portion of the apartment.

The bell may be located in any part of the building, and in cases where the different apartments of a large building such as a hotel are each supplied with one of the alarms, proper connections may be made with an annunciator in the office.

The device may be applied so that only the weight F and wire E are visible, or with the weight F, wire E and plates $c, c'$, exposed. The weight may be given an ornamental appearance.

Having thus described my invention, what I claim as new, and desire to secure by Letters Patent, is—

1. The combination with an electrical circuit which includes a source, and a bell or alarm, of an automatic circuit-closing device also forming a part of the circuit, and comprising a pair of stationary contact plates separated from each other by an insulated space, a spring held to one of said plates and bridging the insulation, a depending weight attached to said spring and normally keeping it out of contact with said plate, and an easily fusible metallic connection between said spring and weight, substantially as specified.

2. In a fire alarm, the automatic circuit closing device comprising a pair of stationary conducting plates to which are connected the respective terminals of an electric circuit, insulating material separating the adjacent ends of said plates, a spring held to the under surface of one of said plates and arranged to bridge the said insulating material and contact with the other of said plates, a lug or projection on said spring near its free end, a weight suspended from said lug, and a wire of easily fused metallic alloy forming the connection between said lug and weight, substantially as specified.

In testimony whereof I affix my signature in presence of two witnesses.

WILLIAM ANDERSON GUTHRIE.

Witnesses:
GEO. H. PARMELEE,
PHILIP C. MASI.